United States Patent [19]
Nishimura

[11] Patent Number: 5,221,163
[45] Date of Patent: Jun. 22, 1993

[54] NICKED CUTTING TOOL
[75] Inventor: Takayuki Nishimura, Nara, Japan
[73] Assignee: GN Tool Co., Ltd., Nara, Japan
[21] Appl. No.: 777,434
[22] Filed: Oct. 11, 1991

Related U.S. Application Data
[63] Continuation of Ser. No. 379,325, Jul. 12, 1989, abandoned.

[30] Foreign Application Priority Data

Oct. 31, 1988 [JP] Japan ................................ 53-277021
Mar. 6, 1989 [JP] Japan .................................. 1-54443

[51] Int. Cl.$^5$ ............................................... B23C 5/10
[52] U.S. Cl. ........................................ 407/53; 408/230
[58] Field of Search .................. 408/230, 26, 227–229, 408/210, 215, 216, 222, 22; 144/21; 407/53–55

[56] References Cited

U.S. PATENT DOCUMENTS 2,887,136  5/1959  Rathgeber ............................ 144/241
2,918,955 12/1959  Simas .................................. 408/22 X
4,475,850 10/1984  Penoza et al. ................... 408/229 X
4,480,949 11/1984  Van De Bogart ..................... 407/54

Primary Examiner—Daniel W. Howell
Attorney, Agent, or Firm—Koda and Androlia

[57] ABSTRACT

This invention relates to a nicked cutting tool suitable for cutting fiber-reinforced composite materials. It has an even number of twisted grooves and lands on the cutting part and the lands have nicks thereon. The nicks are preferably designed so as to incline to the longitudinal axis of the tool, and the nicks on two lands adjacent to each other in the circumferential direction incline in opposite directions to the longitudinal axis of the tool. It is possible to design the nicks so as to incline with regard to the tangent of the helix line of the twisted grooves, and in this case, the nicks on two lands adjacent to each other in the circumferential direction incline in opposite directions with regard to the helix line. In the rotation of the tool, the lands having nicks inclining in opposite directions contact alternately with the workpiece, and the fibers of the workpiece are thereby cut securely, and the shavings are discharged smoothly. The heat generated when cutting can also be dispersed.

6 Claims, 6 Drawing Sheets

NICKED CUTTING TOOL

This is a continuation of application Ser. No. 379,325, filed Jul. 12, 1989, now abandoned.

BACKGROUND OF THE INVENTION

1. Field of the Invention

This invention relates to a nicked cutting tool, more particularly to a cutting tool suitable for cutting and machining fiber-reinforced composite materials.

2. Prior Art

Fiber-reinforced composite materials using fibers such as aramid fiber and carbon fiber have been widely used. The fiber-reinforced composite materials are formed by coating the surface of base metal such as steel materials with these fibers to unify them, and because of their superior mechanical and physical properties, they are used very often particularly in the aircraft industries and space industries.

When cutting and machining such fiber-reinforced composite materials by cutting tools such as twist drills, reamers, end mills, and milling cutters, special cutting performances different from those required in cutting normal metallic materials are demanded.

For example, 1. fibers should be cut so as not to form naps, separations, burrs or the like; 2. since the thermal conductivity of the fiber is low, the heat generated by cutting should be efficiently transmitted to the cutting tool to be released; 3. cutting should be performed at low temperature so as not to melt the fiber due to the temperature rise of the workpiece; and others.

Cutting tools capable of machining efficiently by providing nicks on the twisted cutting edge so as to discharge the chips smoothly when cutting have been well known, but in many of the existing cutting tools, nicks formed on lands were orthogonal to the longitudinal axis of the tool. There are some tools in which nicks were inclined to the longitudinal axis of the tool, but anyway, in the existing cutting tools, all the nicks installed on lands were in an identical direction. Because it was designed so that the above actions and effects could be brought about during the rotation in a specific direction because the rotating direction of the cutting tool is determined in one.

SUMMARY OF THE INVENTION

In this way, in the existing cutting tools, the nicks are formed in an identical direction, and hence naps, separations, burrs or the like are often formed on fibers for reinforcement applied on the base metal when cutting and processing fiber-reinforced composite materials described above, and they are not suitable for cutting of these materials. On the other hand, since the fiber-reinforced composite materials have low thermal conductivity in the reinforcing fibers, the heat generated in cutting is not released sufficiently and the temperature of the workpiece is raised when being cut at high speed, and as a result, the reinforcing fibers sometimes are melted down.

This invention is made to solve the above problems, and it is hence a primary object of this invention to present a cutting tool capable of cutting the above fiber-reinforced composite materials without forming any naps, separations, burrs or the like, at high speed, and at the same time, capable of processing at low temperature with little temperature rise of the workpiece when being cut.

It is another object of this invention to present the above sort of cutting tools capable of obtaining a preferable processed face and having a superior durability.

To achieve the above objects, the following technical means are provided in this invention.

That is, the invention presents a cutting tool possessing twisted grooves and lands on a cutting part, and having nicks on the lands; wherein the twisted grooves and lands are provided in an even number, the nicks on the lands are formed obliquely to the longitudinal axis of the tool, and the nicks on adjacent lands in the circumferential direction of the cutting part incline in opposite directions to each other with regard to the longitudinal axis of the tool.

It is preferable to incline the nicks at almost equal angles to the longitudinal axis of the tool. At this moment, the nicks on two lands adjacent to each other in the circumferential direction become symmetric to each other with regard to the longitudinal axis.

It may, however, be designed to incline the nicks at almost equal angles not to the longitudinal axis of the tool but to the tangent of the helix line of the twisted groove. In this case, the nicks on two lands adjacent to each other in the circumferential direction become symmetrical with regard to the helix line of the twisted groove.

It is preferable to set the pitch of the nicks equal to the width of the nicks.

It is further preferable to design the sectional shape of the nicks in a saw tooth shape. It may be thereby designed so that the outer edges of each portions on the lands divided by the nicks on two lands adjacent to each other in the circumferential direction of the cutting part should face mutually opposite directions.

It may still be designed to hollow the face at the tip of the cutting part so as not to form an cutting edge on the face at the tip.

It moreover may be designed to make the cutting part in a taper shape, and in this case, it is preferable to design the twisted grooves in equal helical and inequal lead structure, and also to substantially unify the width of the lands from the tip to the base end of the cutting part.

As constructed in the above way, when the tool is in operation, lands of which nicks have opposite inclining angles contact alternately with the workpiece. Accordingly, the fibers of the workpiece are securely cut by the twisted lip, and the shavings can be smoothly discharged. The heat generated by cutting can also be released away together with the shavings, and therefor there is little possibility of temperature rise in the workpiece.

Since the nicks on lands adjacent to each other have opposite inclining directions, when the tool is rotated, the same relation as that obtained when the nicks are disposed cross over each other is brought about, and preferably finished surfaces can be obtained.

In addition, disposition of nicks on all lands reduces the cutting resistance and enables a high-speed cutting.

BRIEF DESCRIPTION OF THE DRAWINGS

FIGS. 1 to 5 show a first embodiment realizing the nicked cutting tool according to this invention as an end mill, wherein FIG. 1 is a partially cut-away plan view of the end mill, FIG. 2 is a partially cut-away front view thereof, FIG. 3 is a sectional view of a cutting part, taken along the line 3—3 in FIG. 1, FIG. 4 is an explanatory drawing showing the relation between the inclining directions and angles of the nicks formed on lands adjacent to each other, and FIG. 5 is a partially magnified perspective view of the tip of the end mill.

FIGS. 6A and 6B are explanatory views showing the sectional shapes of the nicks, in which FIG. 6a is an asymmetrical sawtooth shape, and FIG. 6b is a symmetrical convex shape.

FIGS. 7 and 8 show a second embodiment realizing the nicked cutting tool according to this invention as an end mill, wherein FIG. 7 is a partially cut-away plan view of the end mill, and FIG. 8 is a sectional view of its cutting part taken along the line 8—8 in FIG. 7, FIGS. 9 and 10 show a third embodiment making the nicked cutting tool according to this invention into a taper drill, wherein

DETAILED DESCRIPTION OF THE INVENTION

Figure 1:
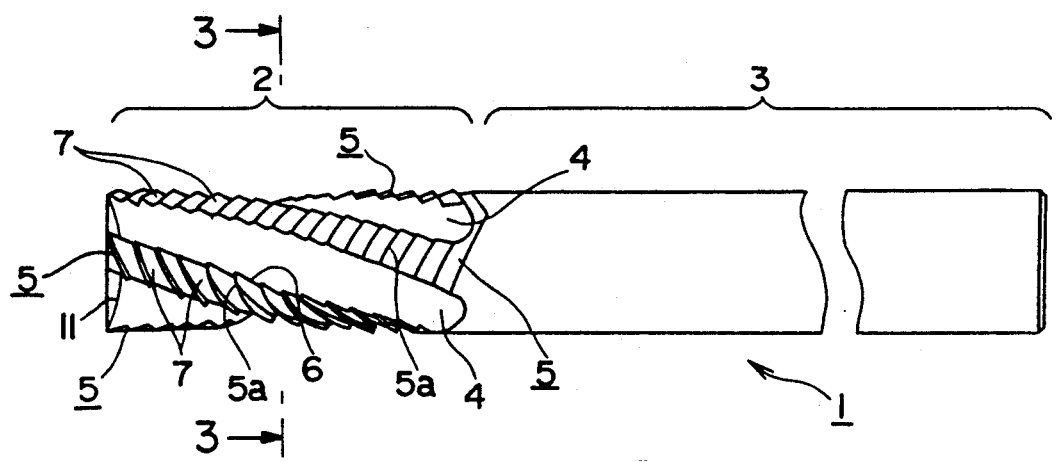
Figure 2:
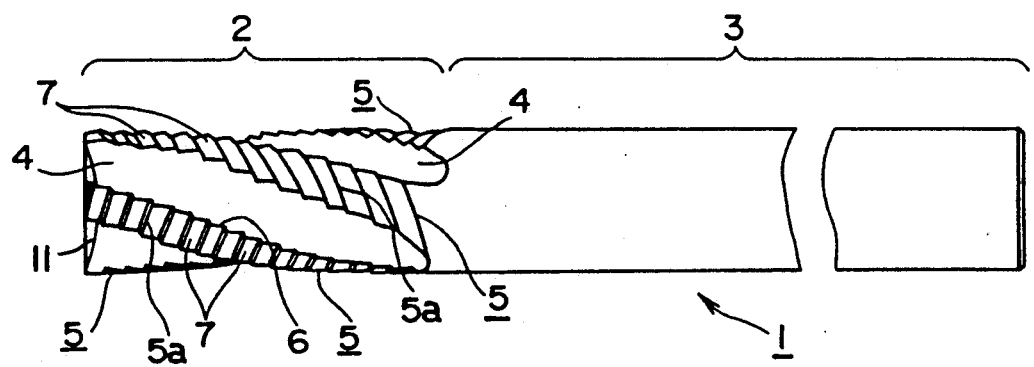
Figure 3:
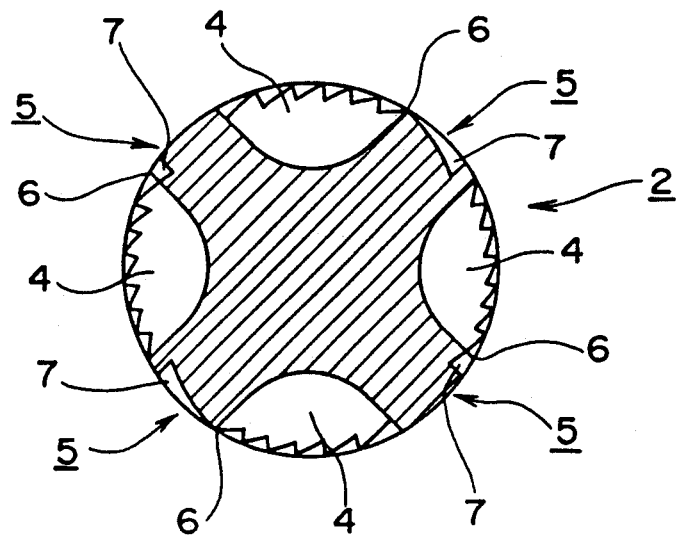
Figure 4:
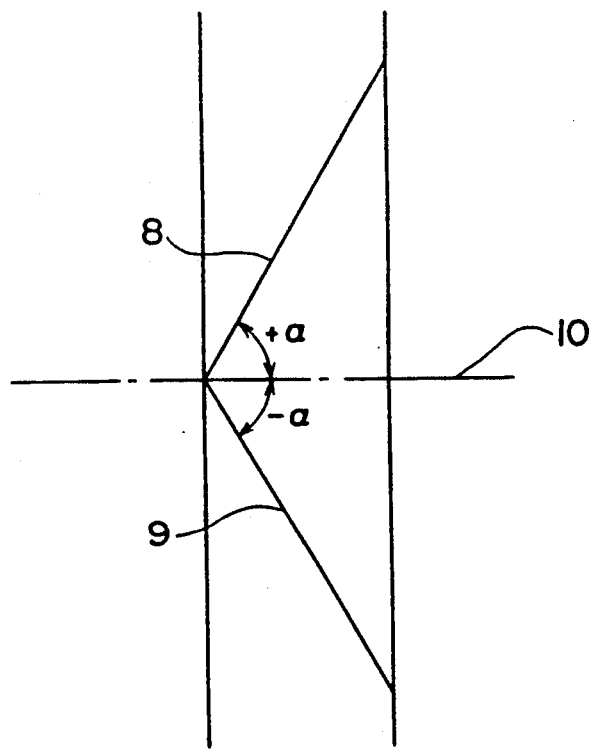

Referring now to the attached drawings, this invention is explained below.

FIG. 1 to FIG. 5 show a first embodiment of the nicked cutting tool of this invention, which is structured into a straight end mill.

The end mill 1 comprises a cutting part 2 and a shank 3, and on the cutting part 2, four twisted grooves 4 arranged at constant intervals in the circumferential direction, and four twisted lands 5 formed by these twisted grooves 4 are installed. A twisted cutting edge or lip 6 is formed on the edges of the lands 5 on the cutting side (left edges seen from the tip face side of the cutting part 2), and plural nicks 7 are provided on its outer surface As a result, each twisted lip 6 is not a smoothly continuous lip, but is composed of plural small lips broken apart by the nicks 7.

Figure 6A:
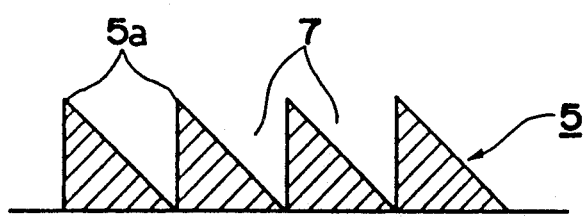

The nicks 7 on the lands 5 are formed in a longitudinally asymmetrical sawtooth shape having a roughly right-angled triangle sectional shape, to be seem in FIG. 6a, and they are arranged on the lands 5 at a constant pitch. In this embodiment, the pitch of the nicks 7 is set equal to the width of the nicks 7, and there is no smoothly curved surface on the outer surface of the lands 5, but plural sharp outer edges 5a are arranged at a constant pitch. The pitch of the nicks means the distance or length between the portions of the nicks which are next to each other in the direction of the axis of the cutting tool. It means that the twisted lips 6 are composed of continuously arranged small lips in a sawtooth shape.

In this embodiment, the nicks 7 are provided along a helix line forming an angle ($\alpha$) to the longitudinal axis of the end mill 1, and they are inclined at the same angle ($\alpha$) with regard to the longitudinal axis, but the inclining directions are different. The nicks 7 on two lands 5 on opposite sides with regard to the longitudinal axis of the end mill 1 incline in an identical direction, but the nicks 7 on two lands 5 adjacent to each other in the circumferential direction incline in opposite directions. The relation is shown in a model in FIG. 4. In this drawing, numerals 8 and 9 indicate straight lines (tangents) drawn along the nicks 7 on two lands 5 adjacent to each other in the circumferential direction, and one straight line 8 makes an angle ($+\alpha$) to the longitudinal axis line 10 of the end mill 1, and the other straight line 9 forms an angle ($-\alpha$) to the longitudinal axis line 10. This relation can be applied to the relation between the nicks 7 on other two lands 5 adjacent to each other.

The sectional shapes of the nicks 7 are all in the sawtooth shape as described above, but all the outer sharp edges 5a on the lands 5 divided by plural nicks 7, do not face an identical direction. As for the directions of these sharp outer edges 5a, there is the same relation as the inclining angle. That is, on two lands 5 on opposite sides to each other with regard to the longitudinal axis, the outer edges 5a face an identical direction, but on two lands 5 adjacent to each other in the circumferential direction, they direct opposite directions. This relation is clearly shown in FIG. 5.

Figure 5:
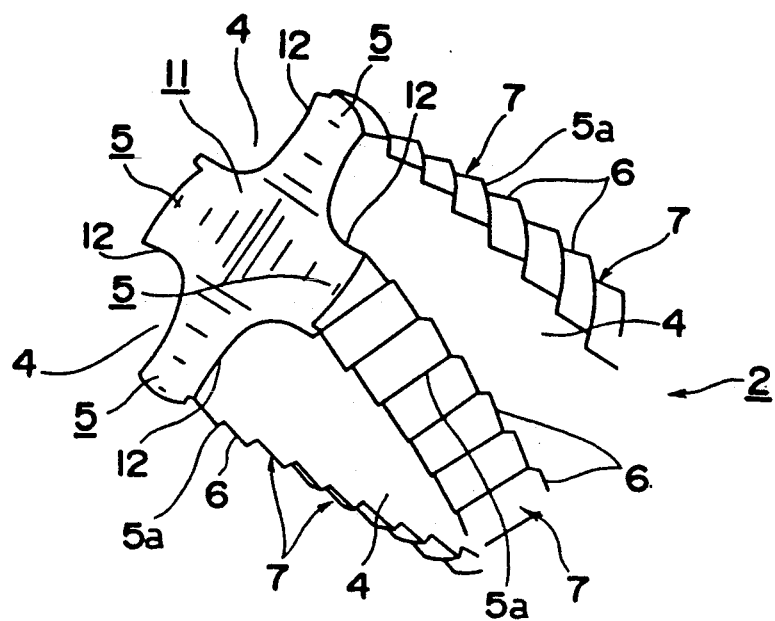

In FIG. 5, the sharp outer edges 5a direct backward (shank 3 side) on an upper right land 5 and a lower left land 5, while they direct forward (tip side of the cutting part 2) on the front side land 5. Though not apparent from the drawing, the outer edge 5a of a land 5 on the back side faces a same direction as that on a front land 5, and in other words, on two lands 5 opposite to each other with regard to the longitudinal axis of the end mill 1, the nicks 7 are formed so that the outer edges 5a face an identical direction, and on two lands 5 adjacent to each other in the circumferential direction, they are designed so that the outer edges 5a face opposite directions.

Figure 6B:
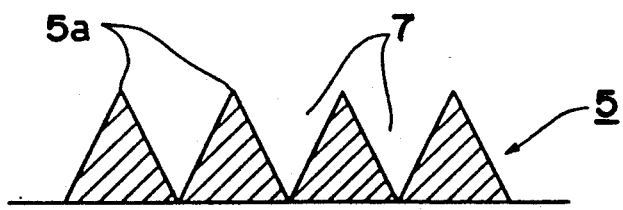

Here, in this embodiment, the sectional shape of the nicks 7 are designed in a right-angled triangular and asymmetrical sawtooth shape, but they may be formed in an equilateral symmetrical convex shape as shown in FIG. 6b, and further formed in an acute triangular shape by entering its bottom a little into the land 5 and forming an engaging face on the lands 5 divided by the nicks 7. It is needless to say that the shape can be modified variously in accordance with necessity.

An end surface 11 of the cutting part 2 is slightly indented to the shank side 3, and not equipped with a lip, but a sharp edge 12 is formed at the portion where the twisted grooves 4 cross with the end surface 11, and hence it is possible to cut by the edge. That is, there is no end lip which is a main cause of oscillation by cutting, and as a result, oscillation by cutting can be minimized, and a highly precise machined surface can be easily obtained It may of course be provided with a lip at this portion.

It is preferable to unify the inclinations of the nicks 7 on a land 5, but it is not necessary to unify them and those on other lands 5, and the only thing that is required is the inclining directions of the nicks on adjacent lands 5 to each other should be opposite.

The nicks 7 may be designed in a curved shape formed from a part of spiral shape as shown in this embodiment, and needless to say designed in a straight lined shape.

The state of operation of the end mill 1 designed in the above way is explained below.

When the end mill 1 is mounted on a chuck of a milling machine and rotated at a high speed, the end mill 1 cuts the fiber-reinforced composite materials by edges 12 of the end surface 11 and twisted lips 6 of lands 5.

At this moment, since the workpiece is cut by the twisted lips 6 formed continuously along the lands 5, it is possible to cut by avoiding intermittent cutting and slight waviness observed in the machining by milling machines. In addition, since the inclinations of the nicks 7 are designed in opposite directions on adjacent lands 5 to each other, the reinforcing fiber can be cut securely by the mutual operation of the twisted lips 6 and nicks 7.

The shavings are also cut fine because of the nicks 7, and can be discharged smoothly and promptly.

By manufacturing a practical product of the above end mill 1, fiber-reinforced composite materials were cut to examine the performances for confirmation. The conditions and the results are shown below.

The end mill 1 was made of cemented carbide, and the helix angle of four twisted grooves 4 was 30° to the right, and the inclining angle of nicks 7 formed on four lands 5 was 25°, that is, the inclining angle of the nicks 7 on two lands located on opposite sides each other with regard to the longitudinal axis was +25° and that of the nicks 7 on the other two lands was −25° C. The sectional shape of the nicks 7 was designed in an asymmetrical sawtooth shape shown in FIG. 6a, and the direction of the sharp outer edge 5a of the lands 5 is also set equal to the case shown in the drawing.

The fiber-reinforced composite material to be cut was a five-layered plate by forming layers of aramid fiber of 0.5 mm thickness on both surfaces of a steel plate of 4 mm thickness, and further mounting layers of carbon fiber of 1 mm thickness on the layers of the aramid fiber.

When cutting the above fiber-reinforced composite material at a speed of 60 m/min., under the conditions of 0.3 mm/rev. of feeding and 2 mm of cutting depth, neither nap, separation nor burr was formed on the fiber for reinforcement on the upper face and lower face of the fiber-reinforced composite material, and a preferable finished surface could be obtained.

From the above results, the end mill 1 of this invention was evidenced to exert superior performances.

Figure 7:
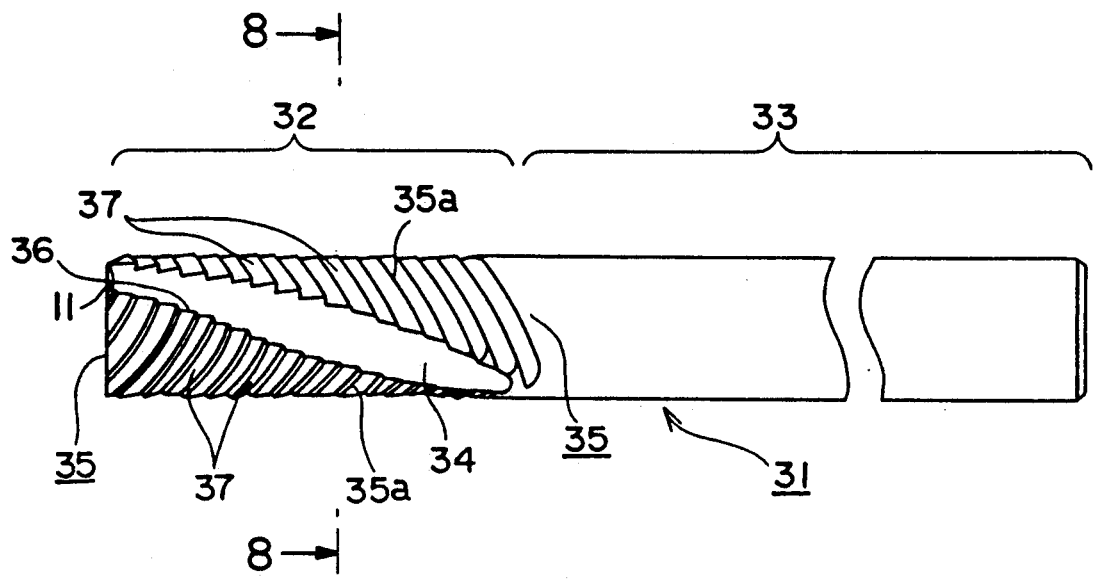
Figure 8:
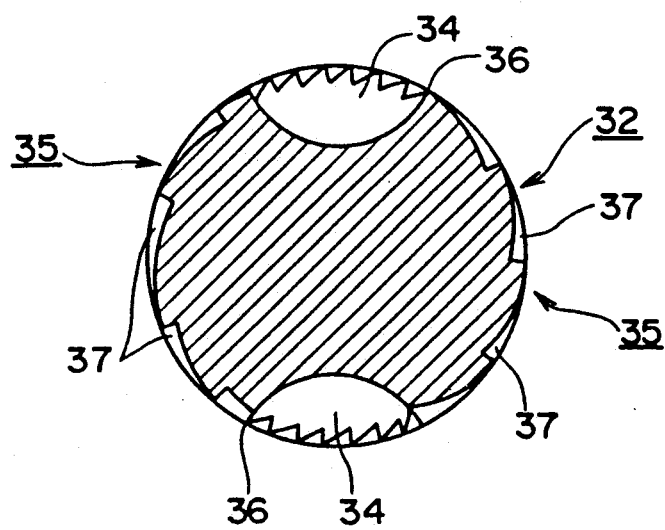

FIG. 7 and FIG. 8 show a second embodiment of this invention. This embodiment is a end mill 31 having two twisted lips and grooves unlike the first embodiment. This end mill 31 is composed of a straight cutting part 32 and a shank 33 in the same way as in the first embodiment, and the cutting part 32 has two twisted grooves 34 and lands 35 disposed oppositely to each other with regard to the longitudinal axis of the end mill 31, and the edges of the lands 35 have twisted lips 36.

In this embodiment, nicks 37 on the two lands 35 have an identical inclining angle to the longitudinal axis of the end mill 31, but the inclining directions are opposite to each other. Accordingly, in this embodiment, the inclining directions of the nicks 37 on the lands 35 adjacent to each other in the circumferential direction of the cutting part 32 are designed opposite. The pitch and the sectional shape of the nicks 37 were same as those in the first embodiment.

Sharp outer edges 35a on the lands 35 formed by the nicks 37 face opposite directions.

As a result, the end mill 31 of this embodiment can also exert the same operations and effects as those in the end mill 1 of the above first embodiment.

As explained above, the number of twisted grooves 4, 34 can be set freely as far as in an even number, and it may be set appropriately according to the usage.

Figure 9:
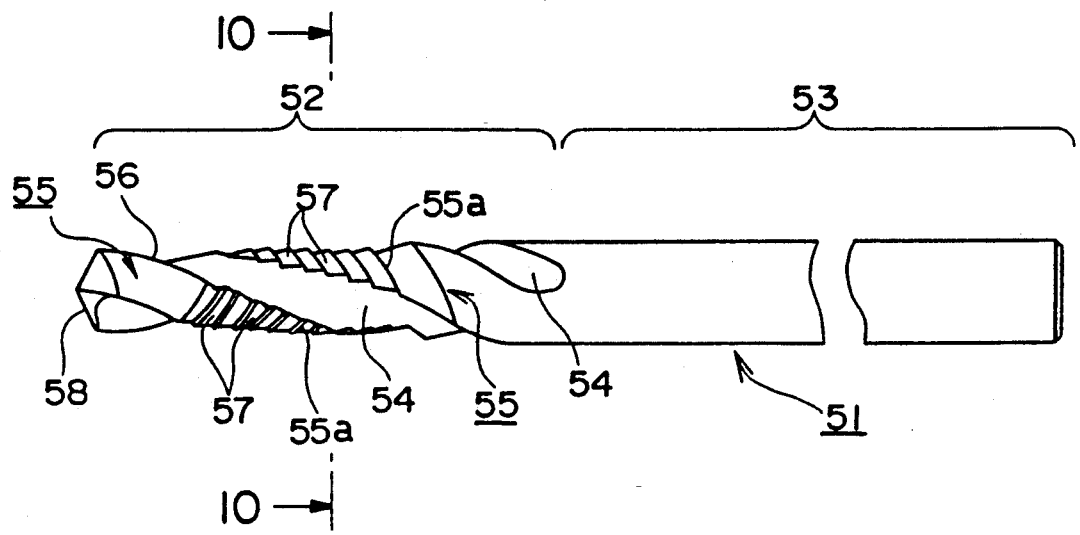
FIG. 9 is a partially cut-away plan view of the taper drill.
Figure 10:
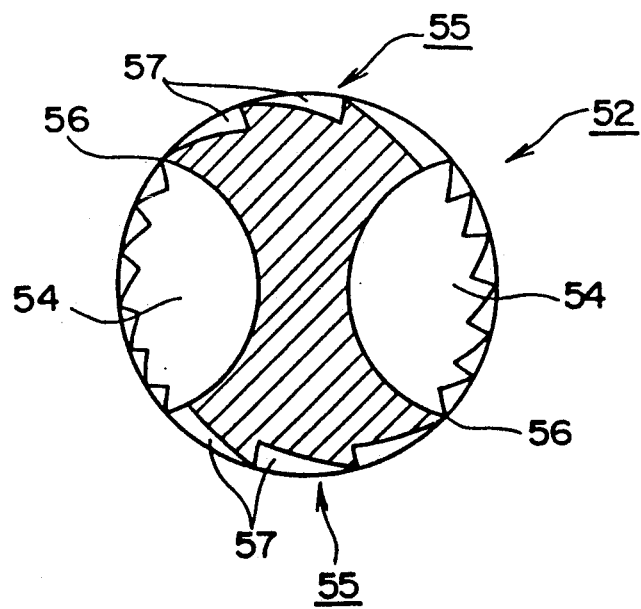
FIG. 10 is a sectional view of its cutting part taken along the line 10—10 in FIG. 9.

FIG. 9 and FIG. 10 show a third embodiment of this invention, which is a drill with a taper-shaped cutting part. This taper drill 51 comprises a taper-shaped cutting part 52 and a straight shank 53, and two twisted grooves 54 with a constant helix angle and a pitch which gradually increases from the tip to the shank are formed on the cutting part 52, and the width of the two lands 55 is designed so as to be substantially uniform from the tip of the base end of the cutting part 52. The edges of the twisted grooves 54 are formed with twisted lips 56.

Not only the fact that the inclining directions of the nicks 57 and the outer edges 55a of the lands 55 are opposite between the lands 55, but also the pitches and sectional shapes of the nicks 57 are the same as in the first embodiment.

When constructed in this way, a stable and preferable cutting state can be obtained in the entire length of the twisted lips 56 whereas the cutting part 52 is in a taper shape, and moreover the shavings can be smoothly discharged even at the points near the shank 53.

Figure 11:
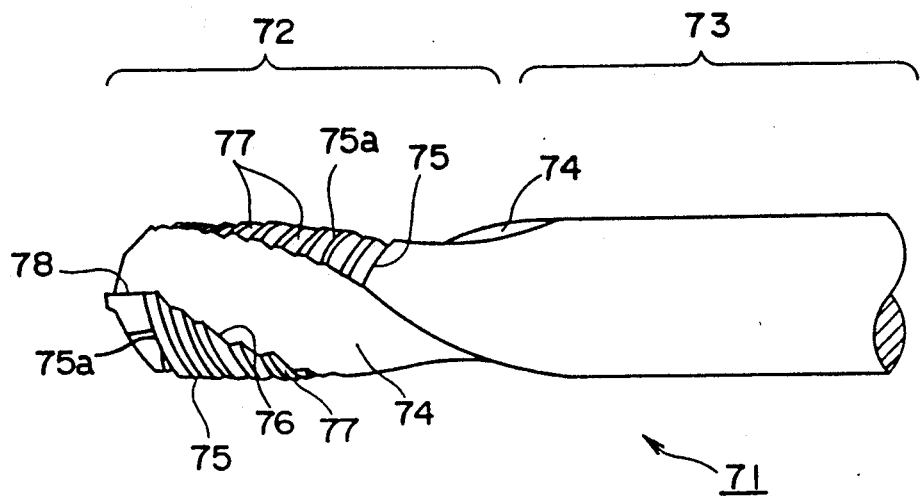
FIG. 11 is a plan view showing principal parts of a fourth embodiment realizing the nicked cutting tool according to this invention as a straight drill.

FIG. 11 shows a fourth embodiment of this invention, which is realized as a straight drill. The straight drill 71 comprises a straight cutting part 72 and a shank 73, and the cutting part 72 possesses two twisted grooves 74 and lands 75 which are located on opposite sides with regard to the longitudinal axis of the straight drill 71. The edges of the lands 75 are formed with twisted lips 76 and the outer surfaces have multiple nicks 77. An end lip 78 is provided at the tip of the cutting part 72.

Figure 13:
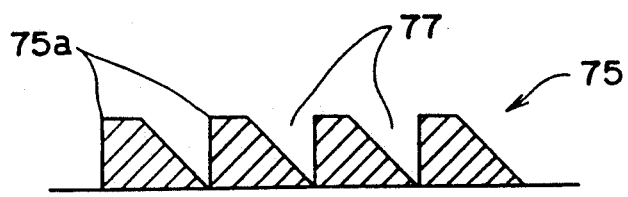
FIG. 13 is an explanatory drawing showing a sectional shape of the nicks.

The nicks 77 are in curves extending along the helix line, and the sectional shape is a sawtooth shape in the same way as in the foregoing embodiments. In this embodiment, however, the pitch of the nicks 77 is set larger than its width as shown in FIG. 13 unlike the above embodiments. Accordingly, curved faces exist on outer surfaces of the lands 75.

The outer edges 75a of the lands at right angles are located on opposite sides each other. That is, in FIG. 11, the outer edge 75a of the land 75 on the upper side is positioned on the front side, while the outer edge 75a of the land 75 on the lower side is arranged on the back side.

The nicks 77 incline in the same way as those in the above embodiments with regard to the longitudinal axis of the straight drill 71, and the inclining directions are opposite on the lands 75, but in this embodiment, they are formed so as to be symmetric to the tangent of the helix line of the twisted groove 74 instead of the longitudinal axis of the straight drill 71.

Figure 12:
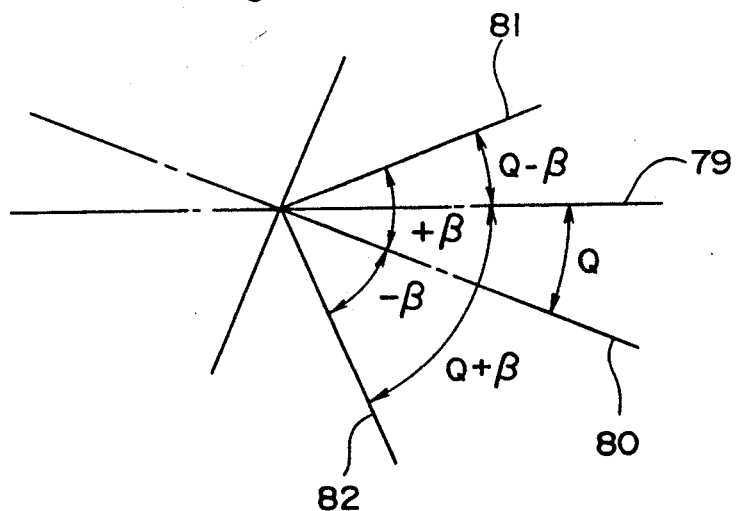
FIG. 12 is an explanatory drawing showing the relation between the inclining directions and angles of the nicks provided on lands adjacent to each other.

This is explained by referring to FIG. 12. Numeral 79 is a longitudinal axis line of the straight drill 71, and 80 is a tangent of the helix line drawn along the twisted groove 74, which inclines by the helix angle (Q) with regard to the longitudinal axis line 79. Numerals 81 and 82 are straight lines (tangents) drawn along the nicks 77 of the two lands 75 respectively. As apparent from the drawing, one straight line 81 drawn along the nicks 77 on one land 75 forms an angle $(+\beta)$ to the tangent 80 of the helix line, while the other straight line 82 drawn along the nicks 77 on the other land 75 forms an angle $(-\beta)$. It means that the nicks 77 are arranged symmetrically with regard to the tangent 80 of the helix line of the nicks 77.

The tangents 80 of the helix line incline by an angle (Q) to the longitudinal axis line 79, that concludes one straight line 81 inclines by an angle $(Q-\beta)$, and the other straight line 82 by an angle (Q+β), to the longitudinal axis line 79.

As explained above, it is possible to set the inclination of the nicks 77 so as to be symmetric to the longitudinal axis of the tool or to the helix line of the twisted grooves.

In the above description, the cutting tool is expressed as a straight end mill, or straight or taper drill, but this invention is not limited to them alone, but the present invention can be applied to other desired cutting tools including straight reamers, taper reamers, taper end mills or the like, and the number of lands and twisted grooves can be set freely as far as in an even number.

This invention possesses the above structure and exerts the following specific effects.

(a) As the nicks 7, 37, 57, 77 inclining to the longitudinal axis of the tool are provided on the lands 5, 35, 55, 75, and the inclining angles of the nicks 7, 37, 57, 77 on two lands 5, 35, 55, 75 adjacent to each other are set opposite, the tool has nicks 7, 37, 57, 77 having different inclining directions disposed alternately in the circumferential direction of the tool. As a result, the fibers for reinforcement can be sufficiently cut, and the fiber-reinforced composite materials stated above can be cut at high speed without forming naps, separations, and burrs.

Moreover, preferable machined surface can be thereby obtained.

(b) The shavings are cut fine and discharged smoothly by the nicks 7, 37, 57, 77 disposed on the lands 5, 35, 55, 75, and hence the heat generated when cutting is efficiently dispersed together with the shavings, and the temperature rise of the workpiece is very small when cutting, thereby enabling to machine at low temperature.

(c) Since it is possible to cut the fiber-reinforced composite materials at high speed without forming naps or the like, no harmful force is applied on the twisted lips 6, 36, 56, 76, edges 12, and end lips 58, 78 when cutting, thereby realizing tools with a long life and superior durability.

(d) When equalizing the pitch of the nicks 7, 37, 57, 77 to their width, plural edges are formed on the outer surface of the lands 5, 35, 55, 75, and as a result, the reinforcing fibers can be securely cut, and the naps of the fiber-reinforced composite materials can be further prevented from being generated.

(e) When designing the sectional shape of the nicks 7, 37, 57, 77 in the sawtooth shape, and forming the outer edges 5a, 35a, 55a, 75a of the lands 5, 35, 55, 75 so as to face opposite directions between the lands 5, 35, 55, 75 adjacent to each other in the circumferential direction, the above effects (a) to (c) are further enhanced.

(f) When the end surface 11 of the knife 2 is indented, and the end surface 11 is not equipped with a lip, the oscillation of the tool during cutting can be inhibited and a highly precise finished surface can be obtained.

(g) When forming the cutting part 52 in a taper shape, and designing the twisted grooves 54 constantly helical with variable lead and so that the width of the lands 55 should be substantially uniform from the end to the base end of the cutting part 52, stable and preferable cutting state can be obtained throughout the entire length of the twisted lips 56, and at the same time, the shavings can be discharged smoothly even at the positions near the shank 53.

What is claimed is:

1. An end mill cylindrical as a whole having at one end a cutting part and at the other end a shank which is mounted to a rotary driving means, said end mill being suited to cut fiber-reinforced composite materials and comprising:

an even number of twisted grooves spirally formed on a circumferential surface of said cutting part;

lands provided between said spiral grooves;

twisted cutting edges formed along one side of a plurality of nicks formed in parallel to each other on said lands, nicks on one of two lands adjacently opposed to each other with one of said twisted grooves therebetween being inclined in one direction relative to an axis of said end mill and nicks on the other one of said two lands adjacently opposed to each other being inclined in another direction which is opposite to said one direction of said nicks on said one land; and outer sharp edges formed between and parallel to said nicks on said lands, said outer sharp edges on one of two lands adjacently opposed to each other facing a tip end of said cutting part and the outer sharp edges on the other one of said two lands adjacently opposed to each other facing the shank of said end mill;

wherein when said shank is mounted to said rotary driving means and rotated in one direction without being moved up and down in the axial direction, a cutting up of said materials is performed by said outer sharp edges formed on one of two lands opposed to each other and a cutting down is performed by said outer sharp edge formed on the other one of said two lands.

2. An end mill according to claim 1, wherein lines defining said nicks are helical and continuous from one twisted groove to the opposed twisted groove.

3. An end mill according to claim 1, wherein the pitch of said plurality of nicks of each land is set substantially equal to the width of said nicks.

4. An end mill according to claim 1, wherein cross sections of said nicks and sharp outer edges which are taken along the direction of an axis of said mill are sawtooth shape.

5. An end mill according to claim 1, wherein said cutting tool is a milling cutter, end surface of said cutting part is indented with no cutting edge formed thereon, and a sharp edge is formed at a portion where said twisted grooves cross with said end surface of said cutting part so that workpiece is cut by said sharp edge and said twisted cutting edge.

6. An end mill according to claim 1, wherein said cutting part is tapered in shape, angle of helix line of said twisted cutting edge is consistent for the entire length of said cutting part, a pitch of said twisted cutting edge gradually increases from tip end toward shank, and width of each said lands is substantially the same for entire length of said cutting part.

* * * * *

UNITED STATES PATENT AND TRADEMARK OFFICE
CERTIFICATE OF CORRECTION

PATENT NO. : 5,221,163
DATED : June 22, 1993
INVENTOR(S) : Takayuki Nishimura It is certified that error appears in the above-identified patent and that said Letters Patent is hereby corrected as shown below:

Column 8, Line 13: After "of" enter --each of said lands;--.

Title Page:
   Item [30] Foreign Application Priority Data:

Change "53-277021" to --63-277021--

Signed and Sealed this

Fifteenth Day of March, 1994

Attest:

BRUCE LEHMAN

*Attesting Officer*     *Commissioner of Patents and Trademarks*